Patented June 2, 1942

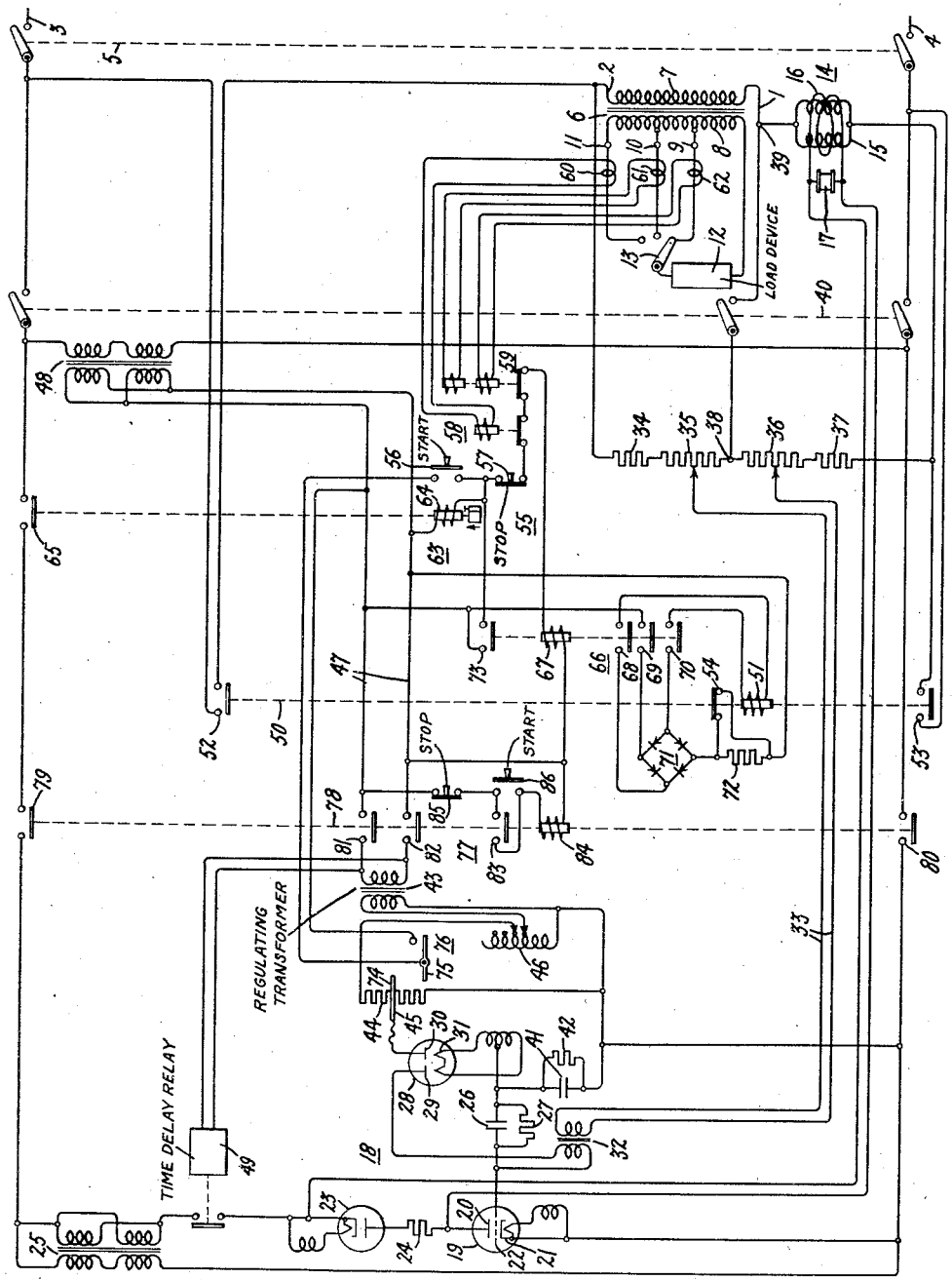

2,285,173

UNITED STATES PATENT OFFICE 2,285,173

ELECTRIC VALVE CIRCUIT

Elbert D. Schneider, Scotia, N. Y., assignor to General Electric Company, a corporation of New York Application August 1, 1941, Serial No. 404,973

11 Claims. (Cl. 171—119)

My invention relates to electric circuits and more particularly to electric valve circuits for controlling an electrical condition, such as the voltage of an associated load circuit.

In electric valve translating systems where an associated load system is energized from a supply circuit, it is frequently desirable to provide control or protective means whereby not only the load circuit but the associated translating apparatus is protected during the starting operation. In accordance with the teachings of my invention described hereinafter, I provide a new and improved control or protective system of this nature.

It is an object of my invention to provide a new and improved electric valve translating circuit.

It is another object of my invention to provide a new and improved protective system for electric valve translating apparatus.

It is a further object of my invention to provide a new and improved protective system for an electric valve translating system wherein protective and interlocking arrangements are provided for preventing the application of an excessively high voltage to the load circuit during the starting operation.

Briefly stated, in the illustrated embodiment of my invention I provide an electric translating system for controlling an electrical condition, such as the voltage, of an associated load circuit which is energized from an alternating current supply circuit. A saturable inductive device, such as a saturable reactor, controls the magnitude of the voltage impressed across the load circuit, and the saturable reactor is controlled by electric valve means. Protective means, such as an interlock, is provided between the initiating means and the operating means to prevent connection of the load circuit to the supply circuit if the electric valve system is in a condition which would effect the application of an excessively high or an injurious voltage to the load circuit.

For a better understanding of my invention, reference may be had to the following description taken in connection with the accompanying drawing and its scope will be pointed out in the appended claims. The single figure of the accompanying drawing diagrammatically illustrates an embodiment of my invention as applied to a system for energizing an alternating current load circuit from an alternating current supply circuit.

Referring now to the single figure of the drawing, my invention is there illustrated as applied to a control or protective system for energizing a load circuit comprising conductors 1 and 2 from an alternating current supply circuit including conductors 3 and 4. A suitable switching means 5 may be employed between the supply circuit and the system. A power transformer 6, having a primary winding 7 and a secondary winding 8, is connected to the load circuit, and the secondary winding 8 may be provided with taps 9, 10 and 11 to afford a number of output voltages which may be impressed across the load device 12. A selector switch 13 is connected between the load device 12 and the various taps of secondary winding 8.

As a control or regulating means for controlling the voltage impressed across the load circuit and hence to control the voltage supplied to the load device 12, I provide a saturable inductive reactance or a saturable inductive device 14 comprising windings 15 which are connected in series relation with the load circuit, that is in series relation with the primary winding 7 of the transformer 6. The inductive reactance of windings 15 is controlled by means of a control winding 16 which is variably energized by unidirectional current to control the voltage drop across windings 15, and hence, to control the magnitude of the voltage supplied to the power transformer 6. A suitable voltage limiting means, such as a resistance 17, is connected across the terminals of the control winding 16. Resistance 17 may be of the type having a negative non-linear impedance-current characteristic.

I employ an electric valve circuit 18 for transmitting variable amounts of unidirectional current to the control winding 16 in response to an electrical condition, such as the voltage of the load circuit. The electric valve circuit 18 comprises an electric valve means 19 preferably of the type employing an ionizable medium, such as a gas or a vapor, and includes an anode 20, a cathode 21 and a control member or grid 22. A unidirectional conducting device, such as an electric valve means 23, is also connected to the control winding 16 in order to provide a path for the flow of current during the negative or reverse half cycles of voltage impressed across winding 16. A current limiting resistance 24 may be connected in series relation with electric valve 23. A transformer 25 is employed for supplying power to the electric valve circuit 18 and also serves as a source of current for control winding 16.

I employ an excitation means or excitation circuit for controlling the potential of the grid 22 of electric valve means 19 and for controlling the magnitude of the unidirectional current transmitted to control winding 16 in response to the magnitude of the load voltage. The excitation circuit includes one control means comprising a capacitance 26 and a shunt connected resistance 27 which are energized by unidirectional current through a unidirectional conducting path which may be provided by an electric valve means 28 having a pair of anodes 29 and 30 and a cathode 31. The voltage produced by capacitance 26 is a negative or turn-off voltage and varies in response to the magnitude of the load voltage. Transformer 32 is energized principally in response to the magnitude of the load voltage through circuit 33 which, in turn, is connected to a voltage divider comprising resistances 34—37, inclusive, the terminal 38 thereof being connected to the common juncture 39 of the primary winding 7 of transformer 6 and windings 15 of the saturable inductive device 14. A switch 40 may be employed to connect the voltage divider to the common juncture 39 and may also be employed as a means for connecting the electric valve circuit and associated control apparatus to the supply circuit. Resistances 34—37, inclusive, are proportioned so that the voltage of circuit 33 varies principally in accordance with the voltage appearing across primary winding 7 and is affected only slightly by the magnitude of the supply voltage.

The excitation circuit for energizing grid 22 of electric valve means 19 also includes a second control means for providing a positive or turn-on voltage. This second control means may comprise a parallel connected capacitance 41 and a resistance 42 which are energized by unidirectional current through the discharge path of electric valve means 28 provided by anode 30 and cathode 31. The second control means is energized by a substantially constant voltage provided by a voltage regulating transformer 43. A voltage divider including a resistance 44 and an adjustable contact 45 is provided to control or establish the magnitude of the voltage which is impressed across the load circuit and to assist with interlocking means, described hereinafter, to prevent closure of the operating circuit or initiating means unless the contact 45 is in that position which assures the application of a relatively low voltage to the load circuit. A suitable voltage adjusting or controlling means, such as an auto-transformer 46, may be connected across the output terminals of the voltage regu'ating transformer 43. Voltage regulating transformer 43 may be energized from circuit 47 which in turn is energized from the supply circuit through a transformer 48. A time delay relay 49 is also employed to delay the application of anode-cathode voltage to electric valves 19 and 23 for a predetermined time, thereby permitting the cathode heating elements of these electric valves to assume safe operating temperatures.

I provide circuit controlling means 50 for connecting the load circuit to the supply circuit. The circuit controlling means 50 may be of the contactor type including an actuating coil 51 and power contacts 52 and 53 which are connected in series relation with primary winding 7 of transformer 6 and the saturable inductive device 14. The circuit controlling means 50 is also provided with control or sealing contacts 54.

Operating means are also provided for controlling the condition of the circuit controlling means 50. This operating means comprises an initiating circuit 55 including a start switch 56, a stop switch 57, and overload protective means, such as current responsive relays 58 and 59 which are energized in response to the load current through current transformers 60, 61 and 62. Initiating circuit 55 also includes a relay 63 having an actuating coil 64 and contacts 65. This relay may be of the time delay type to prevent the closure of, and the energization of, the electric valve circuit which energizes the control winding 16 of the saturable inductive device 14, while contacts 52 and 53 are in the open circuit position. In this manner, sufficient time is afforded to permit disappearance of any transients in the alternating current windings 15 of the saturable inductive device occasioned by the closure of contacts 52 and 53, before closure of the circuit which energizes the control winding 16. This feature of employing a time delay relay in a system of this nature is disclosed and broadly claimed in a copending patent application Serial No. 404,974 of A. R. Ryan filed concurrently herewith and assigned to the assignee of the present application. I also provide a relay 66 having an actuating coil 67 and contacts 68—70. A rectifier 71 is employed for energizing the actuating coil 51 which is connected to the output terminals of rectifier 71 through contacts 69 and 70. Contacts 68 are employed to connect the input terminals of rectifier 71 to circuit 47 through a resistance 72. When circuit controlling means 50 is in the energized condition, contacts 54 are open, effectively connecting resistance 72 in series relation with the input terminals of rectifier 71, thereby effectively reducing the voltage applied to the rectifier and reducing the current supplied to coil 51. Relay 66 is also provided with a pair of holding or sealing contacts 73 which serve to keep actuating coil 67 energized after starting switch 56 is released.

I provide an interlocking means to prevent closure of the circuit controlling means 50 in the event the excitation circuit for the electric valve means 19 is in a condition which would effect the application of an excessive or injurious voltage to the load circuit. This interlocking means may be made responsive to the position of the movable member or contact 45 and may be provided with an extension 74 which engages the actuating or contact member 75 of a switch 76, the contacts of which are connected in series relation with the initiating circuit 55. By virtue of this connection, it is impossible to initiate operation of the operating means unless the contact 45 is in a position to impress a relatively low positive voltage on grid 22 of electric valve means 19. In other words, it is impossible to effect connection of the load circuit to the supply circuit if the saturable inductive device 14 is highly saturated, which condition would effect application of a high or undesirable voltage to the load circuit.

I also provide a second initiating circuit 77 including a contactor 78 having contacts 79 and 80 which serve to connect the supply circuit to the electric valve circuit 18 and which also include contacts 81 and 82 which connect transformer 43 to circuit 47. Contactor 78 is further provided with sealing-in contacts 83. Actuating coil 84 of the contactor 78 is connected to be energized from circuit 47 through a circuit including a stop switch 85 and a start switch 86.

The operation of the embodiment of my invention illustrated on the accompanying drawing will be explained by first considering the system during the starting operation. Switches 5 and 40 are closed, effecting energization of circuit 47. The system is started by closure of the starting switch 56. Upon closure of switch 56, actuating coil 67 of relay 66 will be energized if the contact 45 is in the lower position, that is, in a position to reduce to a minimum or to a very low value the magnitude of the positive or turn-on voltage. In this manner, an interlocking means is provided to assure that the saturable inductive device 14 is not saturated and thereby prevents the application of a high voltage initially to the load circuit. In other words, the circuit controlling means 50 through the relay 66 cannot be operated unless the contacts of the switch 76 are closed. If the contact 45 is in the lower position effecting closure of the contacts of switch 76, closure of the starting switch 56 energizes actuating coil 67 of relay 66 from circuit 47. Operation of relay 66 effects energization of actuating coil 51 of circuit controlling means 50, effecting closure of contacts 52 and 53 thereby connecting the power transformer 6 and the saturable inductive device 14 in series relation across the supply circuit. As explained above, the time delay relay 63 prevents energization of the circuit which energizes the control winding of the saturable inductive device to introduce a time delay period so that any transient current in the alternating current winding of the saturable reactor disappears before the closure of contacts 52 and 53.

Closure of the start switch 86 effects energization of actuating coil 84 of contactor 78 and consequently effects closure of contacts 79—83 inclusive. The time delay relay 49 is initiated in its operation and, after an interval of time sufficient to permit the cathode heating elements of the associated electric valve equipment to attain safe operating temperatures, closes its contacts to apply anode-cathode voltage to electric valve 23. Adjustment of contact 45 establishes the magnitude to the unidirectional current transmitted to control winding 16 and consequently controls the magnitude of the voltage impressed across the load circuit.

The manner in which the system operates to maintain the voltage across the load circuit substantially constant will now be explained. As is well understood by those skilled in the art, the inductive reactance of windings 15 of the saturable inductive device 14 is determined by the magnetization or saturation of that device. As the magnitude of the current transmitted to winding 16 increases, the saturation of the inductive device consequently increases, effecting a reduction in the value of the inductive reactance. As the inductive reactance is decreased, the voltage drop across windings 15 correspondingly decreases and the voltage across the load circuit, that is across the primary winding 7 of transformer 6, increases. The voltage fed back to the control grid 22 of electric valve means 19 through circuit 33 and transformer 32 varies in accordance with the load voltage. As the voltage tends to increase above the desired value, the magnitude of the negative control voltage appearing across capacitance 26 correspondingly increases and serves to render the electric valve means 19 conducting at a later time during its positive half cycles of applied anode-cathode voltage, consequently effecting a reduction in the magnitude of the current transmitted to control winding 16 and correspondingly increasing the inductive reactance of windings 15. As a result of this action, the voltage impressed across the load circuit will be reduced to the desired value. Conversely, the system operates in the reverse manner to raise the voltage across the load circuit to the predetermined value in the event the voltage of the load circuit tends to decrease below the predetermined value. The positive unidirectional voltage produced by capacitance 41 is of a pulsating mature having a period greater than one-half cycle of the supply voltage due to the time constant of the associated circuit. The peak value of this voltage remains constant due to the regulating action of transformer 43 so that the resultant regulating effect of electric valve means 19 is determined by the difference of the positive and negative unidirectional control voltages.

In the event the load circuit demands a current greater than the predetermined value for which relays 58 and 59 are set, at least one of these relays will operate to open circuit 55 effecting deenergization of coils 67 and 51 of relay 66 and circuit controlling means 50, respectively, to disconnect the load circuit and the saturable inductive device 14 from the supply circuit thereby protecting the system. Of course, the operation of the system may be stopped by operating switches 57 and 85.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, means for controlling an electrical condition of said load circuit, means for controlling said first mentioned means and including an electric valve comprising a control member, an excitation circuit including control means for impressing on said control member a voltage tending to increase the magnitude of said electrical condition, and including a movable member, circuit controlling means for connecting said load circuit to said supply circuit, operating means for said circuit controlling means, and interlock means connected between said operating means and said movable member for preventing closure of said circuit controlling means unless said movable member is in a predetermined position.

2. In combination, an alternating current supply circuit, a load circuit, control means for said load circuit, circuit controlling means for connecting said load circuit to said supply circuit, means for controlling said control means comprising an electric valve having a control member, excitation means for said control member comprising means for impressing thereon a negative voltage which varies in response to the magnitude of an electrical condition of said load circuit and control means for impressing on said control member a positive voltage, said last mentioned control means comprising a voltage divider having a movable member, operating means for said circuit controlling means, and interlock means connected between said operating means and said movable member for preventing operation of said circuit controlling means unless said movable member is in a predetermined position.

3. In combination, an alternating current supply circuit, a load circuit, means for controlling an electrical condition of said load circuit comprising a saturable inductive device, circuit controlling means for connecting said load circuit to said supply circuit, means for controlling said saturable inductive device comprising an electric valve means provided with a control member, an excitation circuit for said control member comprising means for impressing thereon a negative control voltage which varies in response to said electrical condition of said load circuit, control means comprising a voltage divider for impressing on said control member a positive control voltage, operating means for said circuit controlling means, and interlock means between said operating means and said voltage divider.

4. In combination, an alternating current supply circuit, a load circuit, means for controlling an electrical condition of said load circuit comprising a saturable inductive device, circuit controlling means for connecting said load circuit and said saturable inductive device to said supply circuit, means for controlling said saturable inductive device comprising an electric valve means provided with a control member, an excitation circuit for energizing said control member comprising means energized in response to said electrical condition for impressing on said control member a negative control voltage and means comprising a voltage divider having a movable contact for impressing on said control member a positive voltage, operating means for said circuit controlling means, and interlock means between said operating means and said contact for preventing operation of said circuit controlling means unless said contact is in a predetermined position.

5. In combination, an alternating current supply circuit, a load circuit, means for controlling an electrical condition of said load circuit comprising a saturable inductive device, circuit controlling means for connecting said load circuit to said supply circuit, means for controlling said saturable inductive device including an electric valve means having a grid, excitation means for energizing said grid comprising means for impressing on said grid a negative voltage which varies in response to said electrical condition and control means for impressing on said grid a positive control voltage, the last mentioned control means comprising a voltage divider for establishing the magnitude of said electrical condition, actuating means for said circuit controlling means comprising an initiating circuit, and interlock means between said voltage divider and said initiating circuit for preventing operation of said circuit controlling means unless said contact is in a predetermined position.

6. In combination, a supply circuit, a load circuit, means for controlling an electrical condition of said load circuit comprising a saturable inductive reactance, circuit controlling means for connecting said load circuit to said supply circuit, means for controlling said saturable inductive reactance comprising an electric valve means having a control member, excitation means for said control member comprising means for impressing thereon a negative control voltage which varies in response to said electrical condition and second control means for impressing thereon a positive control voltage, operating means for said circuit controlling means, interlock means between said second control means and said operating means for preventing operation of said operating means to prevent closure of said circuit controlling means, and means for effecting energization of said second control means from said supply circuit.

7. In combination, a supply circuit, a load circuit, means for controlling an electrical condition of said load circuit comprising a saturable inductive device having a control winding, circuit controlling means for connecting said load circuit to said supply circuit, means for variably energizing said control winding comprising an electric valve means having a control member, excitation means including means for impressing on said control member a negative voltage variable in accordance with said electrical condition and second control means for impressing on said control member a positive control voltage, operating means for said circuit controlling means, interlock means connected between said second control means and said operating means for preventing closure of said circuit controlling means when said second control means is not in condition for operation, and means for effecting energization of said second control means from said supply circuit.

8. In combination, an alternating current supply circuit, a load circuit, means for controlling the voltage of said load circuit comprising a saturable inductive device having a control winding, means for variably energizing said control winding comprising an electric valve means having a control member, an excitation circuit for said control member comprising control means for impressing thereon a negative voltage variable in response to the magnitude of said load voltage and a second control means for impressing on said control member a positive control voltage, circuit controlling means for connecting said load circuit to said supply circuit, operating means for said circuit controlling means, and interlock means between said second means and said operating means for preventing closure of said circuit controlling means when said second control means is not in condition for operation.

9. In combination, an alternating current supply circuit, a load circuit, means for controlling the voltage of said load circuit comprising a saturable inductive device having a control winding, means for variably energizing said control winding comprising an electric valve means having a control member, an excitation circuit for said control member comprising control means for impressing thereon a negative voltage variable in response to the magnitude of said load voltage and a second control means for impressing on said control member a positive control voltage, circuit controlling means for connecting said load circuit to said supply circuit, operating means for said circuit controlling means, and means for preventing application of excessive voltage to said load circuit during the starting operation comprising interlock means connected between said operating means and said second control means.

10. In combination, an alternating current supply circuit, a load circuit, means for controlling the voltage of said load circuit comprising a saturable inductive device having a control winding, means for variably energizing said control winding comprising an electric valve means having a control member, an excitation circuit for said control member comprising control means for impressing thereon a negative voltage variable in response to the magnitude of said load voltage and a second control means for impressing on said control member a positive control voltage, circuit controlling means for connecting said load circuit to said supply circuit, operating means for said circuit controlling means, means for preventing application of excessive voltage to said load circuit during the starting operation comprising interlock means connected between said operating means and said second means, and current responsive means connected to said operating means for opening said circuit controlling means in the event the load current tends to exceed a predetermined value.

11. In combination, an alternating current supply circuit, a load circuit, means for controlling an operating condition of said load circuit, means for controlling said first mentioned means and including an electric valve comprising a control member, an excitation circuit including control means for impressing on said control member a voltage tending to increase the magnitude of said electrical condition, circuit controlling means for connecting said load circuit to said supply circuit, operating means for said circuit controlling means, and interlock means connected between said operating means and said control means for preventing closure of said circuit controlling means unless said control means is in a predetermined condition.

ELBERT D. SCHNEIDER.